March 1, 1927.
G. W. TANNER
CASTER WHEEL
Filed Nov. 30, 1925
1,619,590
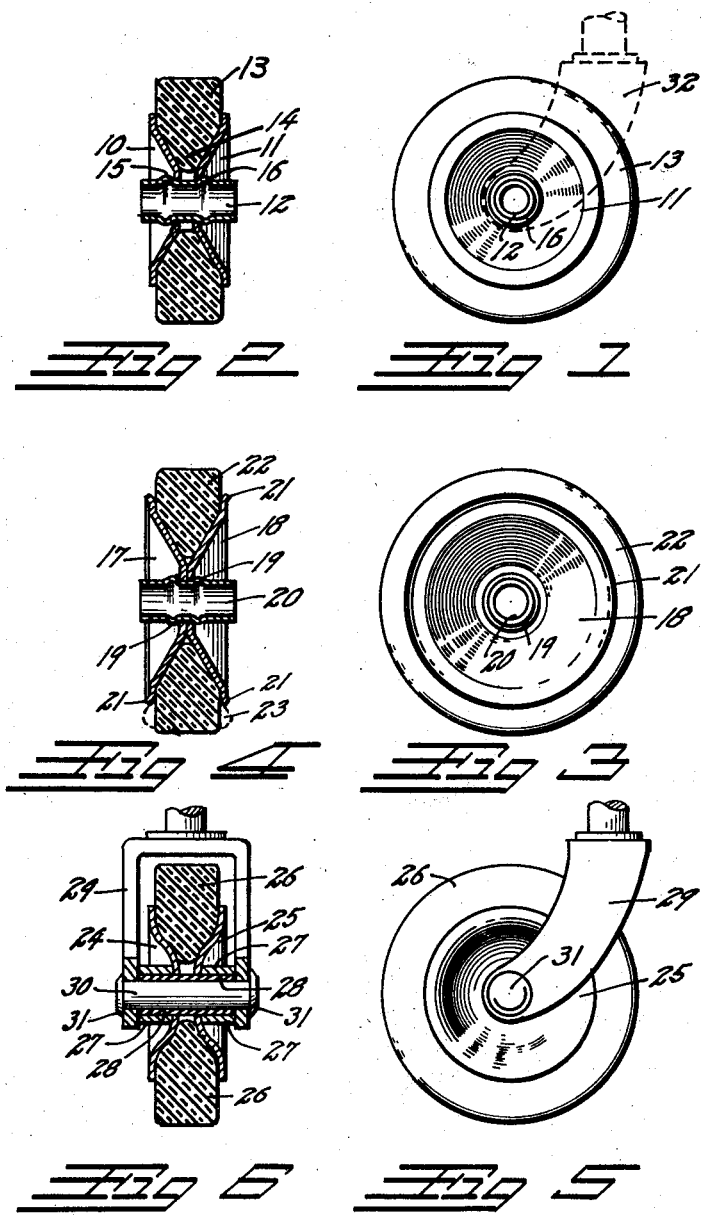
INVENTOR.
GEORGE W. TANNER
BY
ATTORNEY.

Patented Mar. 1, 1927.

1,619,590

UNITED STATES PATENT OFFICE.

GEORGE W. TANNER, OF OTIS, COLORADO.

CASTER WHEEL.

Application filed November 30, 1925. Serial No. 72,178.

This invention relates to wheels for use in furniture casters, and has for its principal object the provision of an efficient mechanism for incorporating a rubber tire in a caster wheel.

Another object is to so construct the wheel that the clamping action upon the rubber tire will increase as the weight upon the caster wheel is increased.

A further object is to construct the tire holding means so that it will not cut into the rubber tire when under pressure.

A still further object is to so construct the component parts of the caster that they will be all locked in place by a single manufacturing step.

Other objects and advantages reside in the detail construction of the device, which is designed for simplicity, economy, and efficiency. These will become more apparent from the following description.

In the following detailed description of the invention, reference is had to the accompanying drawing which forms a part hereof. Like numerals refer to like parts in all views of the drawing and throughout the description.

In the drawing:

Figs. 1 and 2 are a side elevation and cross section, respectively, through the preferred form of the invention.

Figs. 3 and 4 are a side elevation and cross section, respectively, through an alternate form of the invention.

Figs. 5 and 6 are a side elevation and cross section, respectively, through a second alternate form of the invention.

The invention comprises two dished discs 10 and 11, each provided with a concentric opening through which an axle collar 12 passes. The axle collar 12 surrounds and bears on the axle of the usual caster bracket, illustrated in broken line at 32, Fig. 1. An annular rubber tire 13 is maintained between the discs 10 and 11. The tire 13 is wedge-shaped toward its least diameter, as shown at 14. The discs 10 and 11 are snugly clamped against the tire 13 by means of beads 15 and 16, respectively, formed upon the axle collar 12. When the axle collars 12 are manufactured, one of these beads will be formed. The other will be formed after the discs 10 and 11 and the tire 13 are in place, so as to act to clamp the two discs against the tire.

This construction provides a wedge-shaped seat for the tire, into which, it is forced by the weight on the caster. Naturally, as this weight increases, the resistance of the wedge-shaped seat to the pressure and movement of the tire will, in turn, also increase and tend to evenly distribute the weight throughout the tire. This construction also has the effect of preventing flattening or spreading of the tire since it, being made of relatively stiff rubber, will force within its seat rather than spread over the edges of the disc.

In the two alternate forms of the invention, the wedge-shaped seat feature is maintained. In the form shown in Figs. 3 and 4, however, the two discs, illustrated at 17 and 18, are provided with a deeper concavity and contact with each other within the circle of the tire. The discs 17 and 18 are maintained together by beads 19 upon an axle collar 20. The edges of the discs 17 and 18, in this form, are turned outwardly, as illustrated at 21, so as to form a second wedge-shaped recess into which the rubber tire, illustrated at 22, will force, should it be expanded by pressure upon the caster wheel, as indicated in broken line at 23.

In the second alternate form of the invention, the beads referred to in the former forms, have been dispensed with. The discs, illustrated at 24 and 25, of this form are maintained against the tire, illustrated at 26, by means of sleeves 27 which surround the axle collar, illustrated at 28, and which bear between the discs and the legs of a caster bracket 29. The caster axle, illustrated at 30, passes through the axle collar 28 and has its ends upset as shown at 31 to prevent expansion of the bracket 29. In this form of the device, the discs are dished in the form of a double curve. In the previous forms, the discs contained a conical concavity.

While a specific form of the improvement has been described and illustrated herein, it is desired to be understood that the same may be varied, within the scope of the appended claim, without departing from the spirit of the invention.

Having thus described the invention, what

I claim and desire secured by Letters Patent is:—

A caster wheel comprising an annular, flat-sided, resilient tire; disks extending from a position parallel to each side of said tire, and parallel to each other, inwardly toward each other and the axis of said tire, the peripheral edges of said disks being turned outwardly away from said tire; an axle collar passing through axial openings in said disks and projections on said collar adapted to maintain said disks against said tire.

In testimony whereof, I affix my signature.

GEORGE W. TANNER.